United States Patent [19]

Nakagawa

[11] Patent Number: 4,621,449
[45] Date of Patent: Nov. 11, 1986

[54] FISHING HOOK

[76] Inventor: Katsutoshi Nakagawa, 517-18, Komoe, Nishiwaki-shi, Hyogo, Japan

[21] Appl. No.: 652,755

[22] Filed: Sep. 20, 1984

[51] Int. Cl.⁴ .............................................. A01K 83/00
[52] U.S. Cl. .................... 43/44.83; 43/42.49; 43/43.16
[58] Field of Search ................ 43/43.16, 44.83, 42.49

[56] References Cited

U.S. PATENT DOCUMENTS

| 319,655 | 6/1885 | Wright | 43/44.83 |
| 4,503,634 | 3/1985 | Hamayasu | 43/43.16 X |

FOREIGN PATENT DOCUMENTS

| 1284585 | 1/1962 | France | 43/44.83 |
| 2312951 | 12/1976 | France | 43/43.16 |
| 793 | of 1884 | United Kingdom | 43/44.83 |

Primary Examiner—Nicholas P. Godici
Assistant Examiner—Carmine Cuda
Attorney, Agent, or Firm—Darby & Darby

[57] ABSTRACT

A fishing hook provided with a mushroom-like stopper portion which is formed at the top end part of the stem of the main body for tying the fishing line and also a notch formed on the axis of the stem toward the upper end part of the stem reaching the top of the tying portion.

4 Claims, 7 Drawing Figures

FISHING HOOK

BACKGROUND OF THE INVENTION

The present invention relates to an improvement in the stopper portion of a fishing hook for tying the fishing line.

The conventional fishing hook is usually of the type wherein a pressing process has been applied to flatten the top of the fishing hook for providing the stopper portion for tying the fishing hook. This kind of the tying portion of the fishing line intends to avoid slipping off of the fishing line from the hook. FIGS. 1 and 2 show the state of fixture of the fishing line to the hook. That is, the fixture of the fishing line 5 wound around the stem 9 of the hook 7 is sustained at the lower end part of tying portion 6. Since the tying portion 6 of the hook 7 is made flattened in this type of hook, the connection of the fishing line 5 with the hook 7 is sustained at two points a, a as shown in FIG. 2, and has a risk of being cut off when a sudden strong pull downward from the hook is made, which is its drawback. Especially when the main body of the hook is small, the lower tying part of the hook is sharpened like a blade. Moreover, the fishing line used to such a small hook is so extremely fine that its risk of being broken is commensurately great.

In order to remove such drawback, there is a kind of hook, as shown in FIG. 3, wherein a round-shaped head plate portion 8 is formed and a notch 10 is provided at a part of said head portion 8, making said part flush with the stem of the hook. When the fishing line 5 is wound around the stem 9, the fishing line 5 is sustained by the round plate portion as a whole. As shown in FIG. 4, in the state of the fishing line 5 being tied to this kind of hook, the clearances b, b take place between the the part of the fishing line 5 which is inserted into the notch along the stem 9 and the fishing line wound around it, which causes the hook 7 to slip off from the fishing line 5. Moreover, there is a danger of cutting off the fishing line 5 by the contact of the fishing line 5 at the upper tip of its winding part with the angular corner of the notch 10.

SUMMARY OF THE INVENTION

The present invention proposes to remove the drawback found in the conventional fishing hook by forming a mushroom-like stopper portion of the fishing line at the upper end part of the stem of the hook and also by forming a notch along the side of the hook reaching the upper end part of the tying portion.

BRIEF DESCRIPTION OF THE DRAWINGS

The drawings show the conventional fishing hook and an example of embodiment of the present invention, wherein.

DETAILED DESCRIPTION OF THE INVENTION

Description will be given hereinafter according to the drawings on the construction of the fishing hook in accordance with the present invention. The main body 1 of the fishing hook 7 is, as shown in FIG. 5, provided with the mushroom-like stopping part 3, having a rather round head, of the fishing line and a notch 4 on the stem from an approximately mid-point of the stem toward its upper end part which is formed on the stem of the hook.

Figure 1:
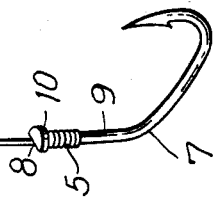
FIG. 1 is a perspective view of the conventional fishing hook.
Figure 2:
FIG. 2 is its plan.
Figure 3:
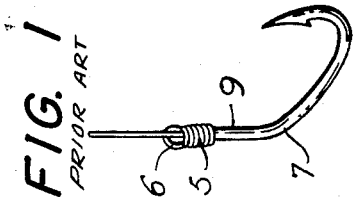
FIG. 3 is a perspective view showing the construction of the conventional fishing hook.
Figure 4:
FIG. 4 is its plan.
Figure 5:
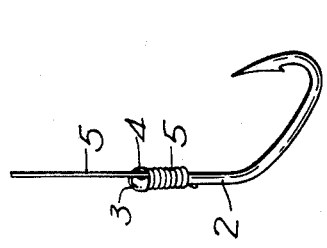
FIG. 5 is an overall perspective view of the fishing hook in accordance with the present invention.

The notch 4 is, as shown in FIG. 5, narrow in width at its lower part and wider at its upper end part, extending at its top stopper part in curvature to the back side of the hook. And it is formed in approximately same depth as the diameter of the fishing line.

Figure 6:
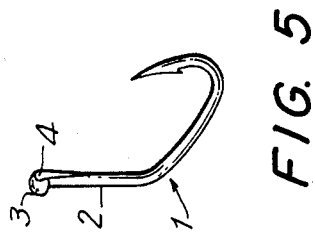
FIG. 6 is a perspective view showing the state of fixture of the fishing line to the hook.
Figure 7:
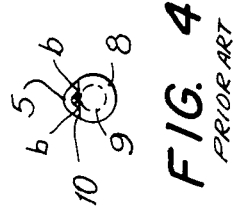
FIG. 7 is its partial plan.

The main body 1 of the hook in accordance with the present invention has the construction as mentioned in the above. The tying of the fishing line 5 to the hook 7 is, as shown in FIGS. 6 and 7, done by inserting the fishing line 5 into the notch 4, and then winding the end portion of the fishing line 5 around the stem 2 of the main body 1 of the hook 7.

The main body 1 of the hook in accordance with the present invention being in construction as described in the above, and the fishing line 5 which is arranged along the stem 2 of the hook 7 being placed in the notch 4, the entire tying part of the fishing line 5 is kept in contact with the stem of the hook 7, which helps fasten its tying condition securely. Moreover, in the absence of angular contacting point of the fishing line 5 with the hook 7, it has an advantage of least danger for being broken off.

What is claimed is:

1. A fishing hook to which a fishing line is to be attached comprising:
   a stem having an upper and lower end,
   a curved hook at the lower end of said stem,
   a line stopper having a greater diameter then said stem at the upper end of said stem,
   a continuous groove formed axially along the upper part of the stem and inwardly from the outer edge of said stopper of a depth sufficient to accommodate the fishing line so that a line wound around the stem in the area of said groove will fully contact the stem and encase the line in said groove.

2. A fishing hook as in claim 1 wherein said stopper is mushroom shaped with the widest part of the mushroom at the top end of the stem.

3. A fishing hook as in claim 1 wherein said groove tapers down in width from the stopper to the end of the groove on the stem.

4. A fishing hook as in claim 2 wherein said groove tapers down in width from the stopper to the end of the groove on the stem.

* * * * *